United States Patent
Izadian

(10) Patent No.: US 10,811,778 B2
(45) Date of Patent: Oct. 20, 2020

(54) CENTER FED OPEN ENDED WAVEGUIDE (OEWG) ANTENNA ARRAYS

(71) Applicant: Waymo LLC, Mountain View, CA (US)

(72) Inventor: Jamal Izadian, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 141 days.

(21) Appl. No.: 16/230,702

(22) Filed: Dec. 21, 2018

(65) Prior Publication Data

US 2020/0203841 A1    Jun. 25, 2020

(51) Int. Cl.
| | |
|---|---|
| *H01Q 13/06* | (2006.01) |
| *G01S 7/03* | (2006.01) |
| *H01Q 21/08* | (2006.01) |

(52) U.S. Cl.
CPC ............. *H01Q 13/06* (2013.01); *G01S 7/032* (2013.01); *H01Q 21/08* (2013.01)

(58) Field of Classification Search
CPC ........ G01S 7/032; H01Q 13/06; H01Q 21/08; H01Q 21/0025; H01Q 25/00; H01Q 3/26; H01Q 3/267; H01Q 3/3676
USPC ........................................................ 342/368
See application file for complete search history.

(56) References Cited

U.S. PATENT DOCUMENTS

| | | | | |
|---|---|---|---|---|
| 5,726,666 A | * | 3/1998 | Hoover | .................. H01Q 13/10 343/767 |
| 5,757,329 A | * | 5/1998 | Hoover | .................. H01Q 13/18 29/600 |
| 6,424,298 B1 | * | 7/2002 | Nishikawa | ......... H01Q 21/0037 343/700 MS |

(Continued)

FOREIGN PATENT DOCUMENTS

| | | |
|---|---|---|
| JP | 2008167246 A | 7/2008 |
| JP | 2011254220 A | 12/2011 |

OTHER PUBLICATIONS

International Search Report and Written Opinion for corresponding PCT application No. PCT/US2019/068080, dated May 21, 2020.

*Primary Examiner* — Harry K Liu

(74) *Attorney, Agent, or Firm* — McDonnell Boehnen Hulbert Berghoff LLP

(57) ABSTRACT

Example radar systems are presented herein. A radar system may include radiating elements configured to radiate electromagnetic energy and arranged symmetrically in a linear array. The radiating elements comprise a set of radiating doublets and a set of radiating singlets. The radar system also includes a waveguide configured to guide electromagnetic energy between each of the plurality of radiating elements and a waveguide feed. The waveguide feed is coupled to the second side of the waveguide at a center location between a first half of the plurality of radiating elements and a second half of the plurality of radiating elements. The waveguide feed is configured to transfer electromagnetic energy between the waveguide and a com- (Continued)

ponent external to the waveguides. The radar system may also include a power dividing network defined by the waveguide and configured to divide the electromagnetic energy transferred by the waveguide feed based on a taper profile.

20 Claims, 8 Drawing Sheets

(56) References Cited

U.S. PATENT DOCUMENTS

| | | | |
|---|---|---|---|
| 6,972,727 B1 * | 12/2005 | West | H01P 1/181 |
| | | | 333/157 |
| 9,979,094 B1 * | 5/2018 | Izadian | H01Q 3/28 |
| 2002/0101385 A1 | 8/2002 | Huor | |
| 2018/0024226 A1 | 1/2018 | Izadian | |

* cited by examiner

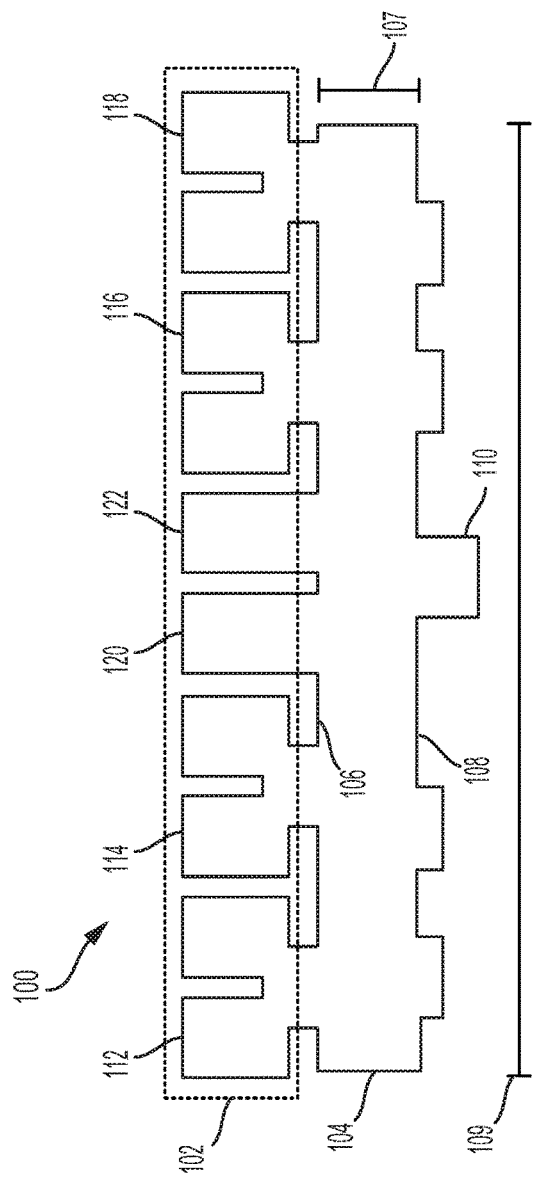
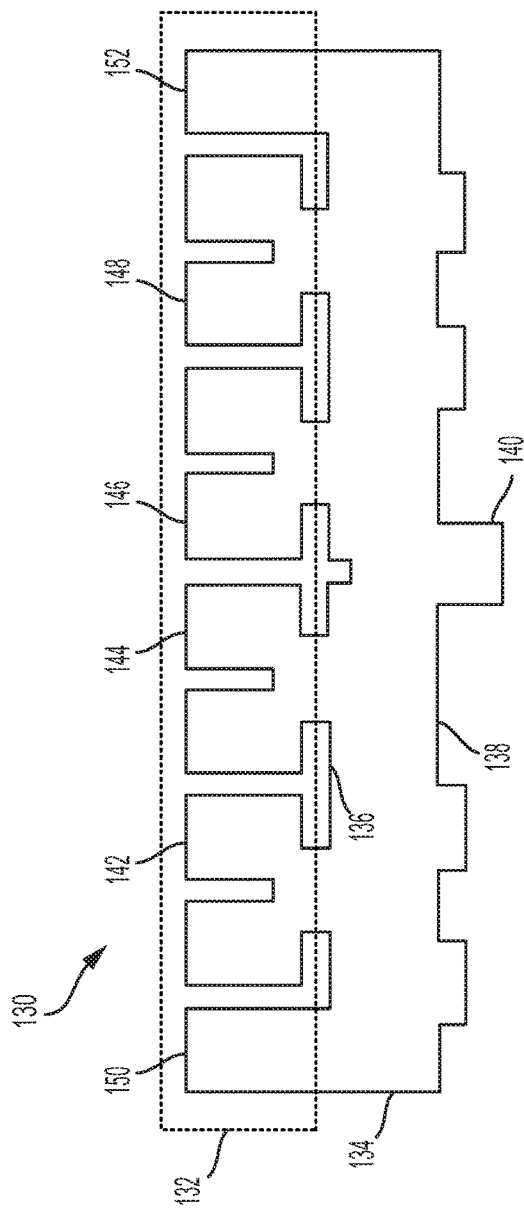
FIG. 1A
FIG. 1B

CENTER FED OPEN ENDED WAVEGUIDE (OEWG) ANTENNA ARRAYS

BACKGROUND

Radio detection and ranging (RADAR) systems can be used to actively estimate distances to environmental features by emitting radio signals and detecting returning reflected signals. Distances to radio-reflective features can be determined according to the time delay between transmission and reception. A radar system can emit a signal that varies in frequency over time, such as a signal with a time-varying frequency ramp. The radar system can then relate the difference in frequency between the emitted signal and the reflected signal in order to derive a range estimate of the object or surface that reflected the emitted signal.

Some radar systems may also estimate relative motion of reflective objects based on Doppler frequency shifts in the received reflected signals. In addition, a radar system may incorporate directional antennas for the transmission and/or reception of signals in order to associate each range estimate with a bearing. The directional antennas can also be used to focus radiated energy on a given field of view of interest enabling the surrounding environment features to be mapped using the radar system.

SUMMARY

In one aspect, the present application describes a system. The system may include a plurality of radiating elements configured to radiate electromagnetic energy and arranged in a linear array. The system also includes a waveguide feed and a waveguide configured to guide electromagnetic energy between (i) each of the plurality of radiating elements and (ii) the waveguide feed. The waveguide comprises a first side and a second side opposite the first side, where the radiating elements are coupled to the first side of the waveguide. The waveguide feed is coupled to the second side of the waveguide at a center location between a first half of the plurality of radiating elements and a second half of the plurality of radiating elements. The waveguide feed is configured to transfer electromagnetic energy between the waveguide and a component external to the waveguide.

In another aspect, the present application describes a method. The method may involve feeding electromagnetic energy to a center of a waveguide by a waveguide feed. The waveguide comprises a first side and a second side opposite of the first side. The method may further involve propagating electromagnetic energy via the waveguide between (i) each of a plurality of radiating elements and (ii) the waveguide feed. The plurality of radiating elements is arranged in a linear array and coupled to the first side of the waveguide. The method also includes, for each radiating element, providing a portion of the propagating electromagnetic energy and radiating at least a portion of the propagating electromagnetic energy via each radiating element.

In yet another aspect, the present application describes a radar system. The radar system includes a plurality of radiating elements configured to radiate electromagnetic energy and arranged in a linear array. The plurality of radiating elements comprises a set of radiating doublets and a set of radiating singlets. The radar system further includes a waveguide feed and a waveguide configured to guide electromagnetic energy between (i) each of the plurality of radiating elements and (ii) the waveguide feed. The waveguide comprises a first side and a second side opposite the first side, where the plurality of radiating elements is coupled to the first side of the waveguide. The waveguide feed is coupled to the second side of the waveguide at a center location between a first half of the plurality of radiating elements and a second half of the plurality of radiating elements. The waveguide feed is configured to transfer electromagnetic energy between the waveguide and a component external to the waveguide.

In still another aspect, a system is provided that includes means for radiating electromagnetic energy. The system includes means for feeding electromagnetic energy to a center of a waveguide by a waveguide feed. The waveguide comprises a first side and a second side opposite of the first side. The system further includes means for propagating electromagnetic energy via the waveguide between (i) each of a plurality of radiating elements and (ii) the waveguide feed. The plurality of radiating elements is arranged in a linear array coupled to the first side of the waveguide. The system includes means for providing a portion of the propagating electromagnetic energy for each radiating element. The system also includes means for radiating at least a portion of the propagating electromagnetic energy via each radiating element.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 1A illustrates a first configuration of an antenna, in accordance with example embodiments.

FIG. 1B illustrates a second configuration of an antenna, in accordance with example embodiments.

DETAILED DESCRIPTION

Figure 1C:
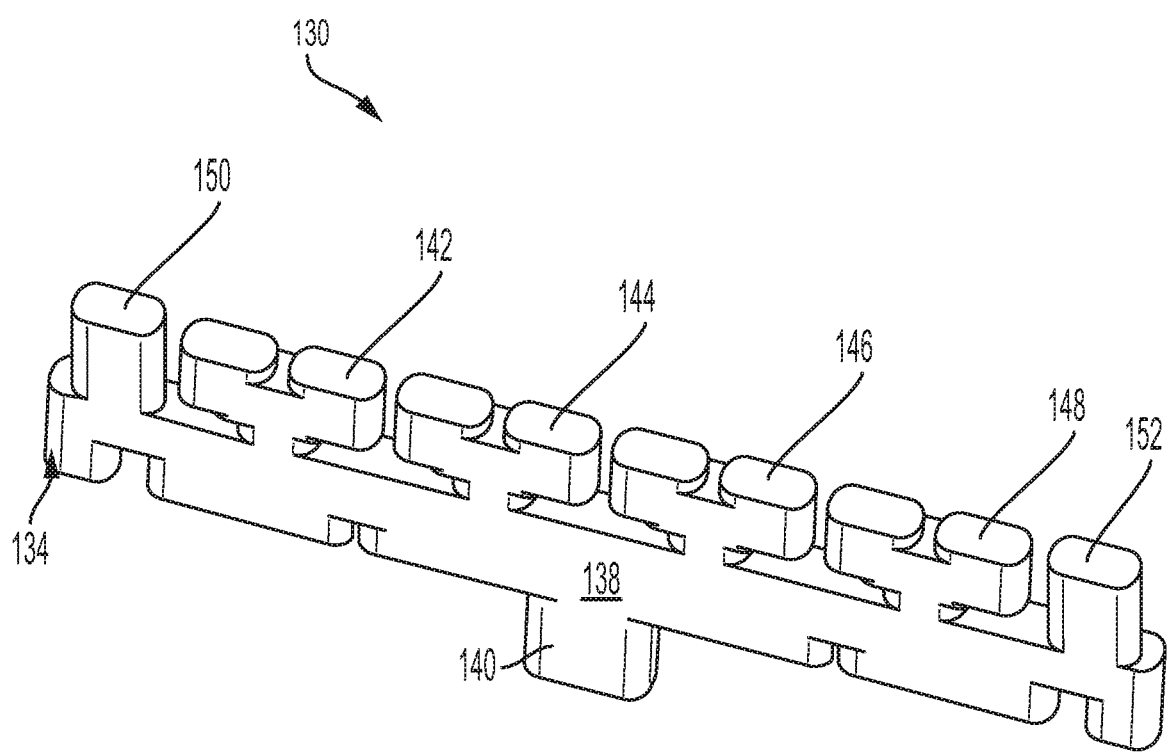
FIG. 1C illustrates a three-dimensional rendering of the second configuration of the antenna shown in FIG. 1B, in accordance with example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A radar system may operate at an electromagnetic wave frequency in the W-Band, for example 77 Giga-Hertz (GHz), resulting in millimeter (mm) electromagnetic wave length (e.g., 3.9 mm for 77 GHz). The radar system may use one or more antennas to focus radiated energy into tight beams to measure a nearby environment. The measurements can be captured with high precision and accuracy. For instance, the radar system may capture measurements of the environment around an autonomous vehicle. Such antennas may be compact (typically with rectangular form factors; e.g., 1.3 inches high by 2.5 inches wide), efficient (i.e., there should be little energy lost to heat in the antenna, or reflected back into the transmitter electronics), and inexpensive and easy to manufacture.

Efficiency can be difficult to achieve in inexpensive, easy to manufacture radar systems. Some inexpensive and easy to manufacture options involve integrating an antenna onto a circuit board (e.g., with a "series-fed patch antenna array). This antenna configuration, however, might lose energy due to the substrate of the circuit board absorbing energy. One technique often used to reduce energy loss involves constructing an antenna using an all-metal design. Conventional all-metal antenna designs (e.g., slotted waveguide arrays), however, might be difficult to manufacture in a manner that incorporates minimal geometries needed to enable 77 GHz operation.

The following detailed description discloses example "open-ended waveguide" (OEWG) antennas for a radar system and methods for fabricating such antennas. The radar system may operate for an autonomous vehicle or another type of navigating entity. In some examples, the term "OEWG" may refer herein to a short section of a horizontal waveguide channel plus a vertical channel. The vertical channel may split into two parts, where each of the two parts of the vertical channel includes an output port configured to radiate at least a portion of electromagnetic waves that enter the antenna. This configuration may be a dual open-ended waveguide. In other examples, the vertical channel itself may form the output as a single element.

An example OEWG antenna may be generated using two or more metal layers (e.g., aluminum plates) machined with computer numerical control (CNC), aligned properly, and joined together. The first metal layer may include a first half of an input waveguide channel. As such, the first half of the first waveguide channel may further include an input port that may be configured to receive electromagnetic waves (e.g., 77 GHz millimeter waves) into the first waveguide channel.

The first metal layer may also include a first half of a plurality of wave-dividing channels. The wave-dividing channels may include a network of channels that branch out from the input waveguide channel and configured to receive electromagnetic waves from the input waveguide channel, divide the electromagnetic waves into portions of electromagnetic waves (i.e., power dividers), and propagate the portions of electromagnetic waves to wave-radiating channels. As such, the two metal layer configuration may be called a split block construction.

The first metal layer may be configured with a first half of the wave-radiating channels that are configured to receive portions of electromagnetic waves from wave-dividing channels. The first halves of the wave-radiating channels include at least one wave-directing member configured to propagate sub-portions of electromagnetic waves to another metal layer.

Moreover, the second metal layer making up the antenna may include second halves of the input waveguide channel, the wave-dividing channels, and the wave-radiating channels. The second halves of the wave-radiating channels may include one or more output ports partially aligned with one or more one wave-directing members. Each wave-directing member may be configured to radiate sub-portions of electromagnetic waves propagated from the one or more wave-directing members out of the second metal layer. As such, a combination of a given wave-directing member with a corresponding pair of output ports may take the form of (and may be referred to herein as) a OEWG, as described above. While in this particular example the antenna includes multiple wave-dividing channels and multiple wave-radiating channels, in other examples the antenna may include, at a minimum, only a single channel configured to propagate all the electromagnetic waves received by the input port to one or more wave-radiating channels. For instance, all or a portion of the electromagnetic waves may be radiated out of the second metal layer by a single OEWG. Other examples are possible as well.

The antenna may further include a waveguide feed coupled on the opposite side of the waveguide from the element feeds for each of the radiating elements. For instance, the element feed or feeds may be located on the top of the waveguide and the waveguide feed may be located on the bottom of the waveguide. During operation of the waveguide in a transmission mode, the waveguide feed may provide electromagnetic energy to the waveguide for transmission by the radiating elements. Conversely, during operation of the waveguide in a reception mode, the waveguide feed may be configured to couple electromagnetic energy received from the radiating elements outside of the feed waveguide.

The waveguide feed may be located at a position along the length of the feed waveguide. For example, in traditional waveguide systems, electromagnetic energy may be fed at one of the ends of the length of the waveguide in a direction corresponding to the length of the waveguide. By feeding a waveguide at the end, power division to achieve the taper profile (i.e., the desired phase and power amplitude for each radiating element) may be more difficult. As disclosed herein, the waveguide can instead be fed from the bottom of the waveguide, in a direction orthogonal to the direction of the length of the waveguide that feeds the radiating elements in some examples. Further, by feeding the waveguide from the bottom at a point along the length, it may be easier to design the power splitting network for the system.

In some embodiments, the waveguide feed is coupled to a side of the waveguide along the length dimension of the waveguide. Particularly, the waveguide may be positioned at a center location between a first half of the radiating elements and a second half of the radiating elements. The first half and second half of the radiating elements may be arranged symmetrically in a linear array on the side of the waveguide opposite of the waveguide feed. Symmetrically may indicate that the first half of the radiating elements and the second half of radiating elements mirror each other (i.e., have a uniform arrangement) starting from a center of the linear array. For instance, each half of the linear array may include the same number of radiating elements and the same type of radiating elements.

When multiple types of radiating elements make up the linear array (e.g., radiating singlets and radiating doublets), the symmetry of the linear array may exist with the first half of the linear array and the second half of the linear array having the same configuration extending away from a center of the linear array. For instance, a linear array may include radiating singlets on both ends and four radiating doublets positioned in between the radiating singlets. As such, the symmetry exists with a first half having a first radiating singlet on the end and two radiating doublets and a second half having a second radiating singlet on the opposite end and two radiating doublets as well. In other examples, each half of the radiating elements may not be symmetrical.

As indicated above, some embodiments may involve the waveguide feed coupled to the waveguide at a center position such that the waveguide feed aligns with a center of the linear array of radiating elements. As such, when the waveguide feed is positioned at a center location in the middle of the radiating elements, the waveguide feed may feed electromagnetic waves to the radiating elements in a common phase regardless of frequency. In turn, the antennas can be created to operate with a wider bandwidth of operation reducing phase issues. In addition, the antennas may also operate with less energy loss.

In some examples, the waveguide feed is positioned to the waveguide in between two sets of radiating doublets and two radiating singlets. The sets of radiating doublets and radiating singlets may be arranged symmetrically in a linear array. For instance, the waveguide feed may be positioned in between a first half of radiating elements consisting of two radiating doublets and a first singlet and a second half of radiating elements consisting of two radiating doublets and a second singlet. The singlets of each half of radiating elements may be positioned at the center of the linear array in between such that two radiating doublets are outside each side of the singlets. In other examples, the singlets may be positioned on the ends of the linear array. As such, the radiating doublets and the radiating singlets may operate with a common phase regardless of frequency. Additionally, in some examples, the waveguide and radiating elements may be symmetric around the central location of the waveguide feed.

In some embodiments, the two or more metal layers making up an antenna may be joined directly, without the use of adhesives, dielectrics, or other materials, and without methods such as soldering, diffusion bonding, etc. that can be used to join two metal layers. For example, the two metal layers may be joined by making the two layers in physical contact without any further means of coupling the layers.

In some examples, the present disclosure provides an integrated power divider and method by which each waveguide that feeds a plurality of radiating elements of a OEWG may have its associated amplitude is adjusted. The amplitude may be adjusted based on a predefined taper profile that specifies a relative phase and power for each respective radiating element. Additionally, the present OEWG may be implemented with a simplified manufacturing process. For example, a CNC machining process or a metal-coated injection molding process may be implemented to make the above-described adjustments in parameters such as height, depth, multiplicity of step-up or step-down phase adjustment components, etc. Yet further, the present disclosure may enable a much more accurate method of synthesizing a desired amplitude and phase to cause a realized gain, side lobe levels, and beam steering for the antenna apparatus, as compared to other types of designs.

Furthermore, while in this particular example, as well as in other examples described herein, the antenna apparatus may be comprised of two metal layers, it should be understood that in still other examples, one or more of the channels described above may be formed into a single metal layer, or into more than two metal layers that make up the antenna. Still further, within examples herein, the concept of electromagnetic waves (or portions/sub-portions thereof) propagating from one layer of a OEWG antenna to another layer is described for the purpose of illustrating functions of certain components of the antenna, such as the wave-directing members. In reality, electromagnetic waves may not be confined to any particular "half" of a channel during certain points of their propagation through the antenna. Rather, at these certain points, the electromagnetic waves may propagate freely through both halves of a given channel when the halves are combined to form the given channel.

Referring now to the figures, FIG. 1A illustrates a first configuration of an antenna. As shown in the first configuration, the antenna 100 includes a set of radiating elements 102, a waveguide 104, and a waveguide feed 110. In other configurations, the antenna 100 may include more or fewer elements.

The set of radiating elements 102 are shown with the radiating elements arranged symmetrically in a linear array. Each radiating element is configured to radiate electromagnetic energy. For instance, the set of radiating elements 102 may receive electromagnetic energy from the waveguide 104 and radiate the electromagnetic energy as radar signals into the environment. The radiating elements 102 may also receive reflected signals that reflected off surfaces in the environment and back towards the antenna 100.

The waveguide 104 is configured to guide electromagnetic energy between the set of radiating elements 102 and the waveguide feed 110. As shown FIG. 1A, the waveguide 104 includes a first side 106 and a second side 108 opposite the first side 106. Particularly, the first side 106 and the second side 108 are orthogonal to a height dimension 107 of the waveguide 104 and parallel to a length dimension 109 of the waveguide 104. As such, the set of radiating elements 102 is coupled to the first side 106 of the waveguide 104.

The waveguide feed 110 is shown coupled to the second side 108 of the waveguide 104 along the length dimension 109 of the waveguide 104. In particular, the waveguide feed 110 is coupled at a center location between a first half of the set of radiating elements 102 and a second half of the set of radiating elements 102. As such, the waveguide feed 110 may be aligned orthogonally to the length of the waveguide 104.

During operation of the antenna 100, the waveguide feed 110 is configured to transfer electromagnetic energy between the waveguide 104 and a component external to the waveguide (e.g., a radar chipset that provides and receives radar signals in the form of electromagnetic energy). In some embodiments, the waveguide feed 110 may serve to direct energy one way from the external component to the waveguide 104. In other embodiments, the waveguide feed 110 is configured to serve as a two-way component that can direct energy both ways between the waveguide 104 and the external component. For example, the waveguide feed 110 may be coupled to a beamforming network. The beamforming network may couple to multiple waveguides (e.g., the waveguide 104) and each waveguide may further link to a set of radiating elements. Therefore, in some examples, multiple sets of radiating elements 102 may form a two-dimensional array and a single feed 110 may provide electromagnetic energy for a plurality of waveguides, like waveguide 104, that each have a set of radiating elements 102 coupled thereto.

In some examples, the waveguide feed 110 may couple to the waveguide 104 at a junction. Particularly, the junction may be configured to divide power based on geometry of the waveguide feed 110 and the waveguide 104.

The antenna 100 is shown with radiating doublets and radiating singlets within the set of radiating elements 102.

Starting from a first end of the linear array, radiating doublet 112 is positioned on the first end and followed by radiating doublet 114, a first radiating singlet 120, a second radiating singlet 122, radiating doublet 116, and radiating doublet 118 positioned on the second end. In the first configuration shown in FIG. 1A, the radiating singlets 120, 122 are positioned together proximate a center of the linear array such a first set of radiating doublets (i.e., radiating doublets 112, 114) is positioned outside the first radiating singlet 120 and a second set of radiating doublets (i.e., radiating doublets 116, 118) is positioned outside the second radiating singlet 122. As such, the arrangement of the first half of radiating elements mirrors the arrangement of the second half of radiating elements when viewed from the center of the linear array. The mirroring arrangements of the halves of radiating elements establish the symmetry of radiating elements within the linear array.

The center positioning of the radiating singlets 120, 122 within the linear array may enable each singlet to transmit with more electromagnetic energy received through the waveguide 104 from the waveguide feed 110. The proximate positioning of the radiating singlets 120, 122 relative to the waveguide feed 110 may enable more electromagnetic energy to enter and transmit through each radiating singlet. This arrangement with singlets in the center may be desirable in antennas where the taper profile specifies that the center elements of an array, here radiating singlets 120, 122, transmit electromagnetic signals with a larger relative amplitude from the other radiating elements of the array.

In some embodiments, the antenna 100 may include dips under waveguide 108 and relative to the waveguide feed 110 that can assist with directing energy towards various radiating elements. The dips may differ in structure, design, and placement within examples. Further, the antenna 100 may not include the dips at all in other embodiments.

The antenna 100 may further include components not shown in FIG. 1A. For instance, the antenna 100 may include a power dividing network defined by the waveguide 104 and configured to divide the electromagnetic energy transferred by the waveguide feed 110 based on a taper profile. Each radiating element may receive a portion of the electromagnetic energy based on the taper profile. In some examples, the power dividing network may unevenly divide the power from the waveguide feed 110. In other examples, the power dividing network may evenly divide the power from the waveguide feed 110.

FIG. 1B illustrates a second configuration of an antenna. Similar to the antenna 100 in the first configuration, the antenna 130 shown in the second configuration includes a set of radiating elements 132, a waveguide 134, and a waveguide feed 140. In other configurations, the antenna 100 may include more or fewer elements.

In the second configuration, the set of radiating elements 132 of the antenna 130 includes a first radiating singlet 150 and a second radiating singlet 152 positioned on the ends of the linear array of radiating elements. Particularly, the first radiating singlet 150 is positioned outside of a first set of radiating doublets (i.e., radiating doublets 142, 144) at a first end of the linear array and the second radiating singlet 152 is positioned outside of a second set of radiating doublets (i.e., radiating doublets 146, 148) at a second end of the linear array. This arrangement with singlets at the ends of the array may be desirable in antennas based on a given taper profile. In other examples that are not shown, doublets and singlets may be combined in other ways as well.

FIG. 1C illustrates a three-dimensional rendering of the second configuration of the antenna shown in FIG. 1B. As shown in the second configuration, the antenna 130 includes a set of radiating elements, a waveguide 134, and a waveguide feed 140. The radiating elements includes a first radiating singlet 150 and a second radiating singlet 152 positioned on opposite ends of the linear array. The antenna 130 further includes radiating doublets 142, 144, 146, 148 positioned in between the radiating singlets 150, 152. As indicated above, the second configuration may be desirable to enable particular operation by the antenna 130 with respect to a taper profile.

The waveguide 134 may be configured in a similar manner the waveguides discussed throughout this disclosure. For example, the waveguide 134 may include various shapes and structures configured to direct electromagnetic power to the various radiating elements (e.g., radiating singlets 150, 152 and radiating doublets 142, 144, 146, 148) of waveguide 134. Particularly, a portion of electromagnetic waves propagating through waveguide 134 may be divided and directed by various recessed wave-directing member and raised wave-directing members.

The pattern of wave-directing members shown in FIG. 1C is one example for the wave-directing members. Based on the specific implementation, the wave-directing members may have different sizes, shapes, and locations. Additionally, the waveguide may be designed to have the waveguide ends to be tuned shorts. For example, the geometry of the ends of the waveguides may be adjusted so the waveguide ends act as tuned shorts to prevent reflections of electromagnetic energy within the waveguide 134.

At each junction of respective radiating elements of the waveguide 134, the junction may be considered a two way power divider. A percentage of the electromagnetic power may couple into the neck of the respective radiating elements and the remaining electromagnetic power may continue to propagate down the waveguide 134. By adjusting the various parameters (e.g. neck width, heights, and steps) of each respective radiating element, the respective percentage of the electromagnetic power may be controlled. Thus, the geometry of each respective radiating element may be controlled in order to achieve the desired power taper. Thus, by adjusting the geometry of each of the offset feed and the each respective radiating element, the desired phase and power taper for a respective waveguide and its associated radiating elements may be achieved.

When the system is being used in a transmission mode, electromagnetic energy may be injected into the waveguide 134 via the waveguide feed 140. The waveguide feed 140 may be a port (i.e. a through hole) in a bottom metal layer. The waveguide feed 140 may serve as a linking waveguide that enables electromagnetic energy to transfer into the waveguide 134.

As such, an electromagnetic signal may be coupled from outside the antenna unit into the waveguide 134 through the waveguide feed 140. The electromagnetic signal may come from a component located outside the antenna unit, such as a printed circuit board, another waveguide, a radar chip, or other signal source. In some examples, the waveguide feed 140 may be coupled to another dividing network of waveguides.

When the system is being used in a reception mode, the various radiating elements may be configured to receive electromagnetic energy from the outside world. In these examples, the waveguide feed 140 may be used to remove electromagnetic energy from the waveguide 134. When electromagnetic energy is removed from the waveguide 134, it may be coupled into components (e.g., one or more radar chips) for further processing.

In many traditional examples, a waveguide feed is located at the end of a waveguide. In the example shown in FIG. 1C, the waveguide feed 140 is located at a center location that aligns with a center of the symmetrical linear array of radiating elements. By centrally locating the waveguide feed 140, the electromagnetic energy that couples into the waveguide 134 may be divided more easily. Further, by locating the waveguide feed 140 at a central position, an antenna unit may be designed in a more compact manner.

When electromagnetic energy enters the waveguide 134 from the waveguide feed 140, the electromagnetic energy may be split in order to achieve a desired radiation pattern. For example, it may be desirable for each of a series of radiating elements in the linear array to receive a predetermined percentage of the electromagnetic energy from the waveguide 134. The waveguide may include a power dividing element (not shown) that is configured to split the electromagnetic energy the travels down each side of the waveguide.

In some examples, the power dividing element may cause the power to be divided evenly or unevenly. The radiating elements may be configured to radiate the electromagnetic energy upon reception of a portion of the electromagnetic energy. In some examples, each radiating element may receive approximately the same percentage of the electromagnetic energy as each other radiating element. In other examples, each radiating element may receive a percentage of the electromagnetic energy based on a taper profile.

In some example taper profiles, the radiating elements of the antenna 130 that are located closer to the center of waveguide 138 relative to the waveguide feed 140 may receive a higher percentage of the electromagnetic energy. In some embodiments, the antenna 130 may include dips under waveguide 138 and relative to the waveguide feed 140 that can assist with directing energy towards various radiating elements. The dips may differ in structure, design, and placement within examples. Further, the antenna 130 may not include the dips at all in other embodiments. If electromagnetic energy is injected into the end of the waveguide 138, it may be more difficult to design the waveguide 138 to correctly split power between the various radiating elements. By locating the waveguide feed 140 at the central position, a more natural power division between the various radiating elements may be achieved.

In some examples, the radiating elements may have an associated taper profile that specifies the radiating elements in the center should receive a higher percentage of the electromagnetic energy than the other elements. Because the waveguide feed 140 is located closer to the center elements, it may be more natural to divide power with elements closest to the waveguide feed 140 receiving higher power. Further, if the waveguide 138 has the waveguide feed 140 located at the center of the waveguide 138, the waveguide 138 may be designed in a symmetrical manner to achieve the desired power division.

In some examples, the antenna 130 may operate in one of two modes. In the first mode, the antenna 130 may receive electromagnetic energy from a source for transmission (i.e. operate as a transmission antenna). In the second mode, the antenna 130 may receive electromagnetic energy from outside of the antenna 130 for processing (i.e. operate as a reception antenna).

Figure 2A:
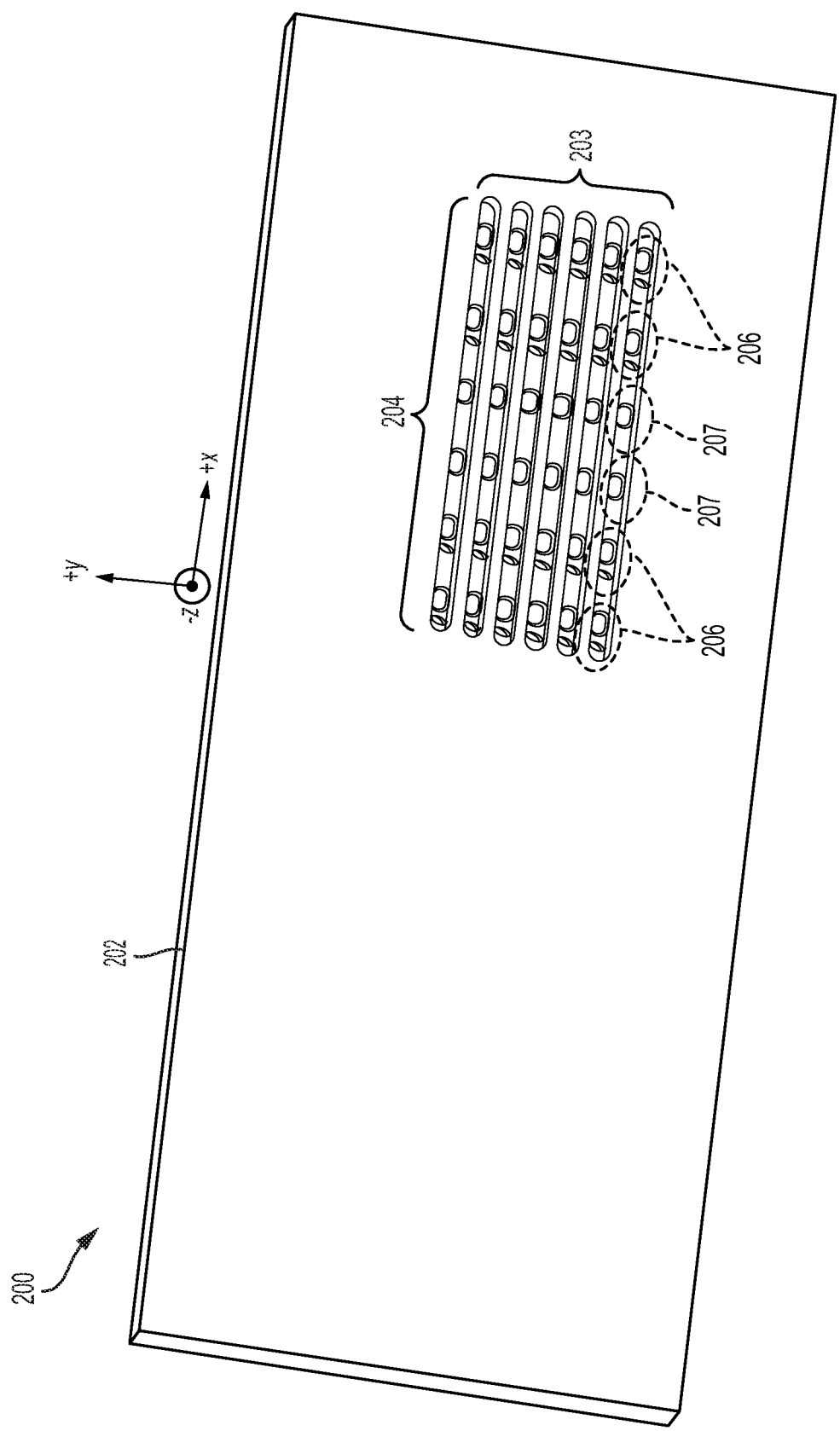
FIG. 2A illustrates a first layer of an antenna, in accordance with example embodiments.

FIG. 2A illustrates a first layer 202 of an antenna 200 that forms a two dimensional array of antenna elements. As shown, the first layer 202 includes a first half of a set of waveguide channels 203. The waveguide channels 203 may include multiple elongated segments 204, each of which corresponds to one or more waveguides. As such, at a first end of each elongated segment 204 may be one or more radiating singlets 206 and radiating doublets 207. Each radiating singlet 206 and radiating doublet 207 may have similar sizes or different from other wave-directing members within examples.

Power may be used to feed a corresponding amount of electromagnetic waves (i.e., energy) into the antenna 200 with one or more through-holes may be the location where these waves are fed into the apparatus. In line with the description above, the single channel/segment of the waveguide channels 203 that includes the input port may be referred to herein as an input waveguide channel.

Upon entering the antenna 200, electromagnetic waves may generally travel in both the +x and −x directions, as the feed couples electromagnetic energy into a center of the waveguides with respect to the x direction. The array may function to divide up the electromagnetic waves and propagate respective portions of the waves to respective first ends of each elongated segment 204. More specifically, the waves may continue to propagate in the +x and −x directions after leaving the array toward the wave-directing members 206. In line with the description above, the array section of the waveguide channels may be referred to herein as wave-dividing channels.

As the portions of the electromagnetic waves reach the wave-directing members 206 at the first end of each elongated segment 204 of the waveguide channels 203, the wave-directing members 206 may propagate through respective sub-portions of the electromagnetic energy to a second half of the waveguide channels (i.e., in the +z direction, as shown). For instance, the electromagnetic energy may first reach a wave-directing member that is recessed, or machined further into the first metal layer 202 (i.e., a pocket). That recessed member may be configured to propagate a smaller fraction of the electromagnetic energy than each of the subsequent members further down the first end, which may be protruding members rather than recessed members.

Further, each subsequent member may be configured to propagate a greater fraction of the electromagnetic waves travelling down that particular elongated segment 204 at the first end than a prior member. As such, the member at the far end of the first end may be configured to propagate the highest fraction of electromagnetic waves. Each wave-directing member 206 may take various shapes with various dimensions. In other examples, more than one member (or none of the members) may be recessed. Still other examples are possible as well. In addition, varying quantities of elongated segments are possible.

A second metal layer may contain a second half of the one or more waveguide channels, where respective portions of the second half of the one or more waveguide channels include an elongated segment substantially aligned with the elongated segment of the first half of the one or more waveguide channels and, at an end of the elongated segment, at least one pair of through-holes partially aligned with the at least one wave-directing member and configured to radiate electromagnetic waves propagated from the at least one wave-directing member out of the second metal layer.

Within examples, the elongated segment of the second half may be considered to substantially align with the elongated segment of the first half when the two segments are within a threshold distance, or when centers of the segments are within a threshold distance. For instance, if the centers of the two segments are within about ±0.051 mm of each other, the segment may be considered to be substantially aligned.

In another example, when the two halves are combined (i.e., when the two metal layers are joined together), edges of the segments may be considered to be substantially aligned if an edge of the first half of a segment and a corresponding edge of the second half of the segment are within about ±0.051 mm of each other.

In still other examples, when joining the two metal layers, one layer may be angled with respect to the other layer such that their sides are not flush with one another. In such other examples, the two metal layers, and thus the two halves of the segments, may be considered to be substantially aligned when this angle offset is less than about 0.5 degrees.

In some embodiments, the at least one pair of through-holes may be perpendicular to the elongated segments of the second half of the one or more waveguide channels. Further, respective pairs of the at least one pair of through-holes may include a first portion and a second portion. As such, a given pair of through-holes may meet at the first portion to form a single channel. That single channel may be configured to receive at least the portion of electromagnetic waves that was propagated by a corresponding wave-directing member and propagate at least a portion of electromagnetic waves to the second portion. Still further, the second portion may include two output ports configured as a doublet and may be configured to receive at least the portion of electromagnetic waves from the first portion of the pair of through-holes and propagate at least that portion of electromagnetic waves out of the two output ports.

Figure 2B:
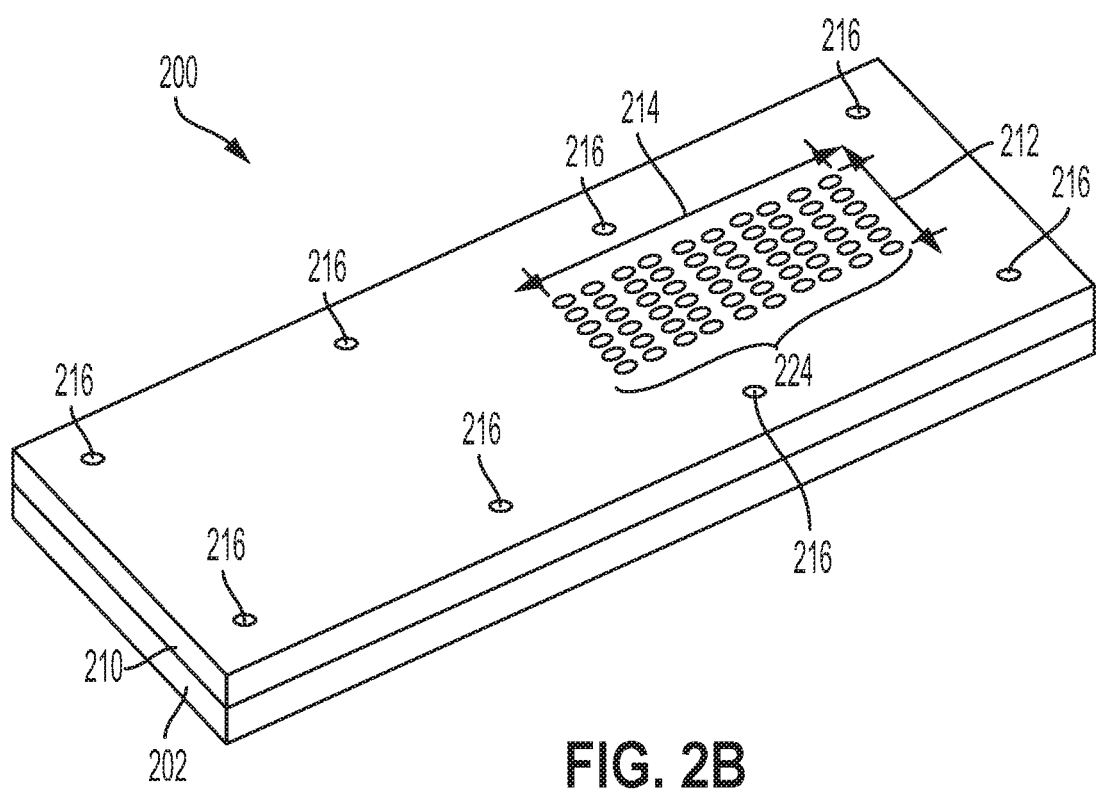
FIG. 2B illustrates another assembled view of the antenna, in accordance with example embodiments.

FIG. 2B illustrates an assembled view of the antenna 200. The antenna 200 may include the first metal layer 202 and the second metal layer 210. The second metal layer 210 may include a plurality of holes 216 (through-holes and/or blind-holes) configured to house alignment pins, screws, and the like. The first metal layer 202 may include a plurality of holes as well (not shown) that are aligned with the holes 216 of the second metal layer 210.

As shown in FIG. 2B, a OEWG array 224 of a given width 212 and a given length 214, which may vary based on the number of OEWGs and channels of the antenna 200. For instance, the OEWG array may have a width of about 11.43 mm and a length of about 28.24 mm. Further, in such an example embodiment, these dimensions, in addition to or alternative to other dimensions of the example antenna 200, may be machined with no less than about a 0.51 mm error, though in other embodiments, more or less of an error may be required. Other dimensions of the OEWG array are possible as well.

In some embodiments, the first and second metal layers 202, 210 may be machined from aluminum plates (e.g., about 6.35 mm stock). In such embodiments, the first metal layer 202 may be at least 3 mm in thickness (e.g., about 5.84 mm to 6.86 mm). Further, the second metal layer 210 may be machined from a 6.35 mm stock to a thickness of about 3.886 mm. Other thicknesses for layers are possible as well. Additionally, in some examples, first and second metal layers 202, 210 may be made through a metal-plated injection molding process. In this process, the layers may be made with plastic through injection molding and coated with metal (either fully metal covered or selectively metal covered).

In some embodiments, the joining of the two metal layers 202, 210 may result in an air gap or other discontinuity between mating surfaces of the two layers. In such embodiments, this gap or continuity should be proximate to (or perhaps as close as possible to) a center of the length of the antenna apparatus and may have a size of about 0.05 mm or smaller.

Figure 2C:
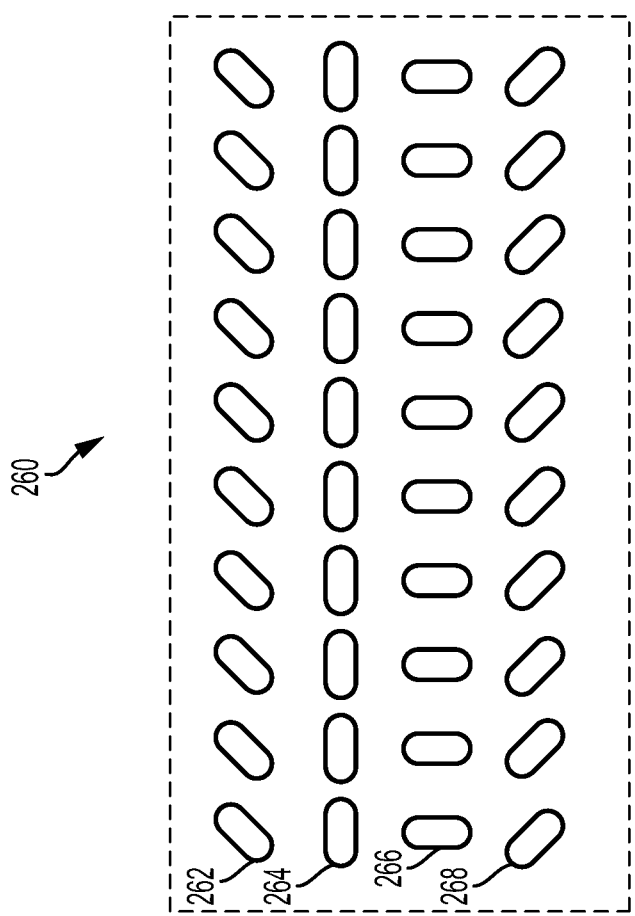
FIG. 2C illustrates an array of radiating elements, in accordance with example embodiments.

FIG. 2C illustrates an example array 260, in accordance with example embodiments. The array 260 may be located on a top block, such as where array 244 is shown in FIG. 2A. As such, the array 260 may be configured to transmit and/or receive radar signals in four different polarizations. In some embodiments, array 260 may be a two dimensional array.

In one dimension, the array 260 may comprise four linear arrays 262, 264, 266, 268. Each of the linear arrays 262, 264, 266, 268 may include a number of radiating elements (e.g., ten radiating elements), each radiating element having a common polarization for each respective linear array. In the other dimension, the array 260 may include one radiating element from each of linear arrays 262, 264, 266, 268, where the phase center of each radiating element forms a line orthogonal to the phase-center line for each of linear arrays 262, 264, 266, 268.

Additionally, each linear array 262, 264, 266, 268, that makes up array 260 may correspond to its own respective input ports 212A-D, as shown in FIG. 2B. Therefore, the array may be able to selectively transmit or receive radar signals in one or more of four different polarizations by feeding radar signals into or receiving radar signals from one or more of the input ports 212A-D. As shown in FIG. 2C, a linear array 262 may be configured to operate with a +45 degree polarization, a linear array 264 may be configured to operate with a horizontal polarization, a linear array 266 may be configured to operate with a vertical polarization, and a linear array 268 may be configured to operate with a −45 degree polarization. The arrangement of the various arrays of array 260 is given as one example, in other embodiments, the location of each linear array in array 260 may be changed (e.g., the order of the polarizations may be different). Further, additional disclosure for a "Multiple Polarization Radar Unit" disclosed in U.S. patent application Ser. No. 15/848,205, filed Dec. 20, 2017 is hereby incorporated by reference in its entirety.

Figure 3:
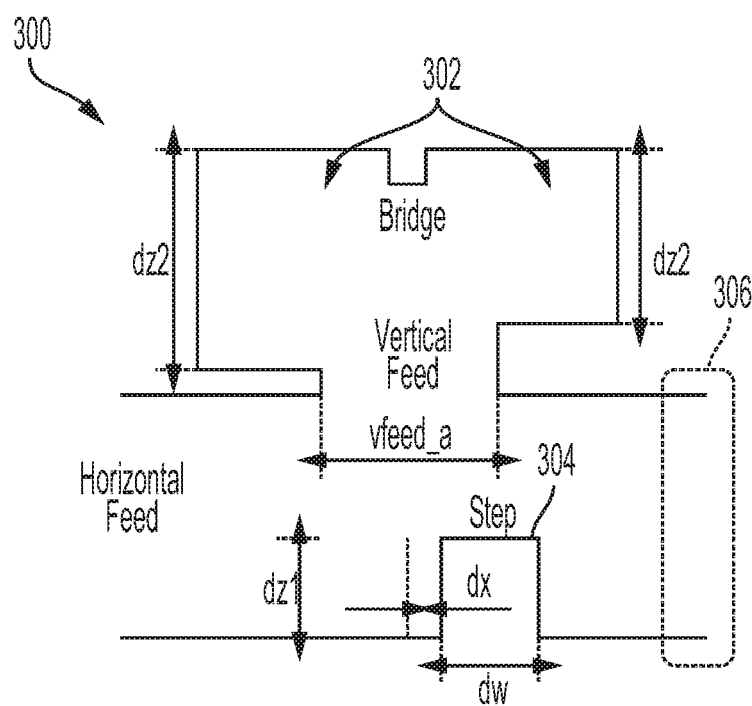
FIG. 3 illustrates a wave-radiating portion of an antenna, in accordance with example embodiments.

FIG. 3 illustrates a wave-radiating doublet of an example antenna, in accordance with an example embodiment. More specifically, FIG. 3 illustrates a cross-section of an example DOEWG 300. As noted above, a DOEWG 300 may include a horizontal feed (i.e., channel), a vertical feed (i.e. a doublet neck), and a wave-directing member 304. The vertical feed may configured to couple energy from the horizontal feed to two output ports 302, each of which is configured to radiate at least a portion of electromagnetic waves out of the DOEWG 300. The horizontal feed may be a waveguide section, such as the examples shown in FIG. 1A, FIG. 1B, and FIG. 1C.

In some embodiments, one or more DOEWG may include a backstop at location 306. Particularly, the backstop 306 may be on the left or right side depending on the DOEWG. DOEWGs that come before the last DOEWG may simply be open at location 306 and electromagnetic waves may propagate through that location 306 to subsequent DOEWGs. For example, a plurality of DOEWGs may be connected in series where the horizontal feed is common across the plurality of DOEWGs. FIG. 3 further shows various parameters that may be adjusted to tune the amplitude and/or phase of an electromagnetic signal that couples into the radiating element.

In order to tune a DOEWG such as DOEWG 300, the vertical feed width, vfeed_a, and various dimensions of the step 304 (e.g., dw, dx, and dz1) may be tuned to achieve different fractions of radiated energy out the DOEWG 300.

The step 304 may also be referred to as a reflecting component as it reflects a portion of the electromagnetic waves that propagate down the horizontal feed into the vertical feed. Further, in some examples, the height dz1 of the reflecting component may be negative, that is may extend below the bottom of the horizontal feed. Similar tuning mechanisms may be used to tune the offset feed as well. For example, the offset feed may include any of the vertical feed width, vfeed_a, and various dimensions of the step (e.g., dw, dx, and dz1) as discussed with respect to the radiating element.

In some examples, each output port 302 of the DOEWG 300 may have an associated phase and amplitude. In order to achieve the desired phase and amplitude for each output port 302, various geometry components may be adjusted. As previously discussed, the step (reflecting component) 304 may direct a portion of the electromagnetic wave through the vertical feed. In order to adjust an amplitude associated with each output port 302 of a respective DOEWG 300, a height associated with each output port 302 may be adjusted. Further, the height associated with each output port 302 could be the height or the depths of this feed section of output port 302, and not only could be a height or depth adjustment but it could be a multiplicity of these changes or steps or ascending or descending heights or depths in general.

As shown in FIG. 3, height dz2 and height dz3 may be adjusted to control the amplitude with respect to the two output ports 302. The adjustments to height dz2 and height dz3 may alter the physical dimensions of the doublet neck (e.g. vertical feed of FIG. 3A). The doublet neck may have dimensions based on the height dz2 and height dz3. Thus, as the height dz2 and height dz3 are altered for various doublets, the dimensions of the doublet neck (i.e. the height of at least one side of the doublet neck) may change. In one example, because height dz2 is greater than height dz3, the output port 302 associated with (i.e. located adjacent to) height dz2 may radiate with a greater amplitude than the amplitude of the signal radiated by the output port 302 associated with height dz3.

Further, in order to adjust the phase associated with each output port 302, steps may be introduced for each output port 302. The steps may be located on the flat sides of the output port 302 and adjust the height of dz2 and dz3 in a stepped manner. The steps in the height may cause a phase of a signal radiated by the output port 302 associated with the step to change. Thus, by controlling both the height and the steps associated with each output port 302, both the amplitude and the phase of a signal transmitted by the output port 302 may be controlled. In various examples, the steps may take various forms, such as a combination of up-steps and down-steps. Additionally, the number of steps may be increased or decreased to control the phase.

The above-mentioned adjustments to the geometry may also be used to adjust a geometry of the offset feed where it connects to the waveguide. For example, heights, widths, and steps may be adjusted or added to the offset feed in order to adjust the radiation properties of the system. An impedance match, phase control, and/or amplitude control may be implemented by adjusting the geometry of the offset feed.

Figure 4:
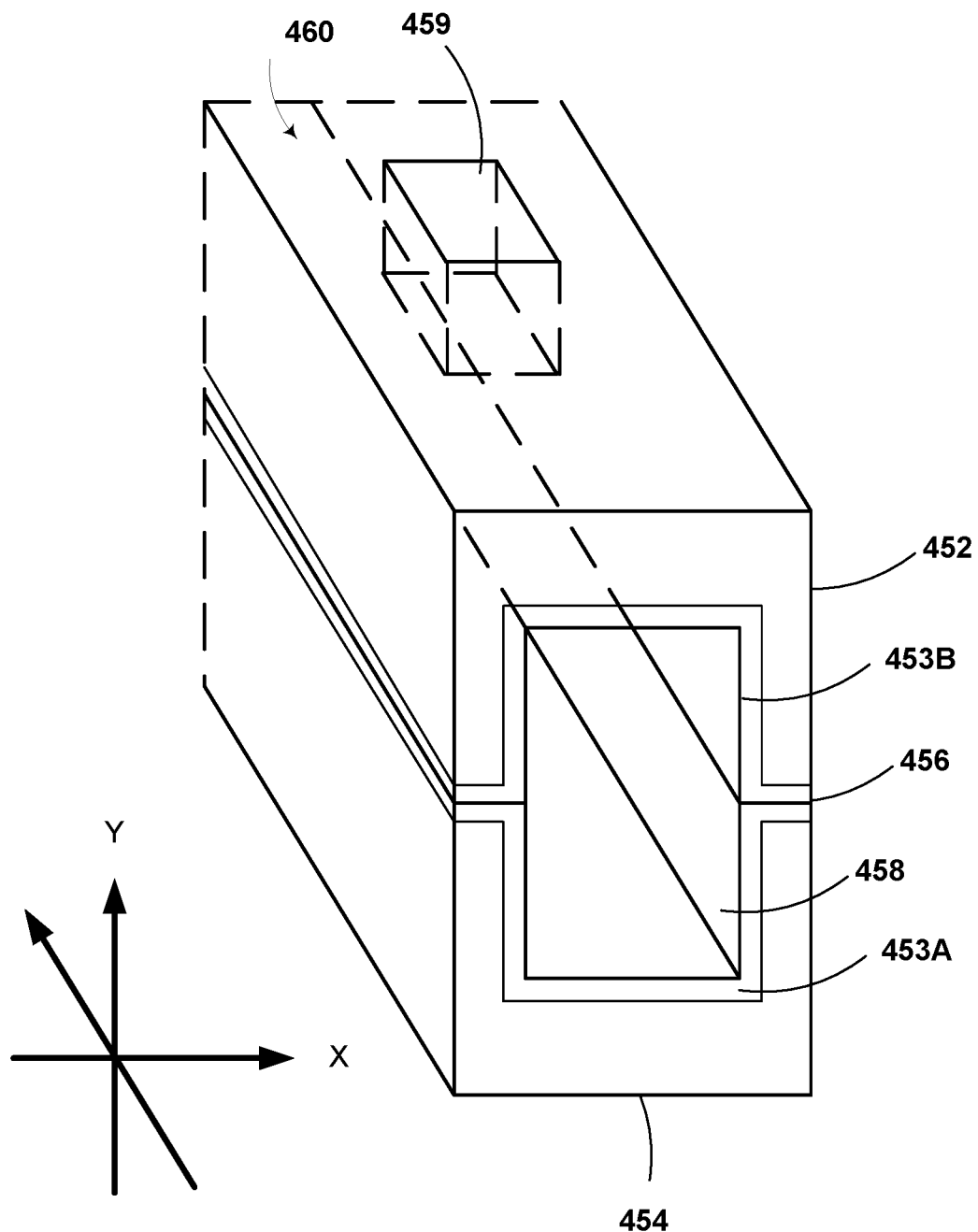
FIG. 4 illustrates another view of the wave-radiating portion of the antenna, in accordance with example embodiments.

In some examples, an antenna may be constructed from a metal-plated polymer structure. The polymer may be formed through an injection molding process and coated with metal to provide the desired electromagnetic properties. FIG. 4 illustrates an example isometric cross-section view of a polymer-based waveguide 460 having a metallic portion 453A, 453B that may form the antenna described herein.

The example waveguide 460 is formed with a top portion 452 and a bottom portion 454. The top portion 452 and a bottom portion 454 are coupled at seam 456. The seam 456 corresponds to a position where two layers couple together. The waveguide includes an air-filled cavity 458. Within cavity 458, electromagnetic energy propagates during the operation of waveguide 460. The waveguide 460 may also include a feed 459. Feed 459 can be used to provide electromagnetic energy to cavity 458 in waveguide 460. Alternatively or additionally, feed 459 may be used to allow electromagnetic energy to leave waveguide 450. The feed 459 may be a location where electromagnetic energy is fed into or removed from the present antenna. In other examples, the feed 459 may be a location where a waveguide receives energy from a different waveguide section of the antenna, such as the splitting or combining ports described with respect to FIGS. 1A and 1C. The example waveguide 460 of FIG. 4 features seam 456 at the middle point of the height of cavity 458. In various embodiments, the top portion 452 and a bottom portion 454 may be coupled together at various different positions along an axis of the waveguide.

As shown in FIG. 4, the top portion 452 and the bottom portion 454 may have a respective metallic portion 453A, 453B. The metallic portion 453A of the bottom portion 454 and the metallic portion 453B of the top portion 452 may each be formed through a plating process. As previously discussed, both the top portion 452 and the bottom portion 454 may be made of a polymer. The respective metallic portions 453A, 453B may be plated onto the RF surfaces, such as the internal portion of cavity 458 and the port 459. Thus, when the top portion 452 is brought into contact with the bottom portion 454, there is an electrical coupling of the respective metal portions. In the example shown in FIG. 4, only the RF surfaces (i.e., the surfaces in which electromagnetic energy come in contact) are plated. In other examples, additional surfaces beyond just the RF surfaces may be plated as well. Further, additional disclosure for a "Plated, Injection Molded, Automotive Radar Waveguide Antenna" disclosed in U.S. patent application Ser. No. 15/219,423, filed Jul. 26, 2016 is hereby incorporated by reference in its entirety.

Figure 5:
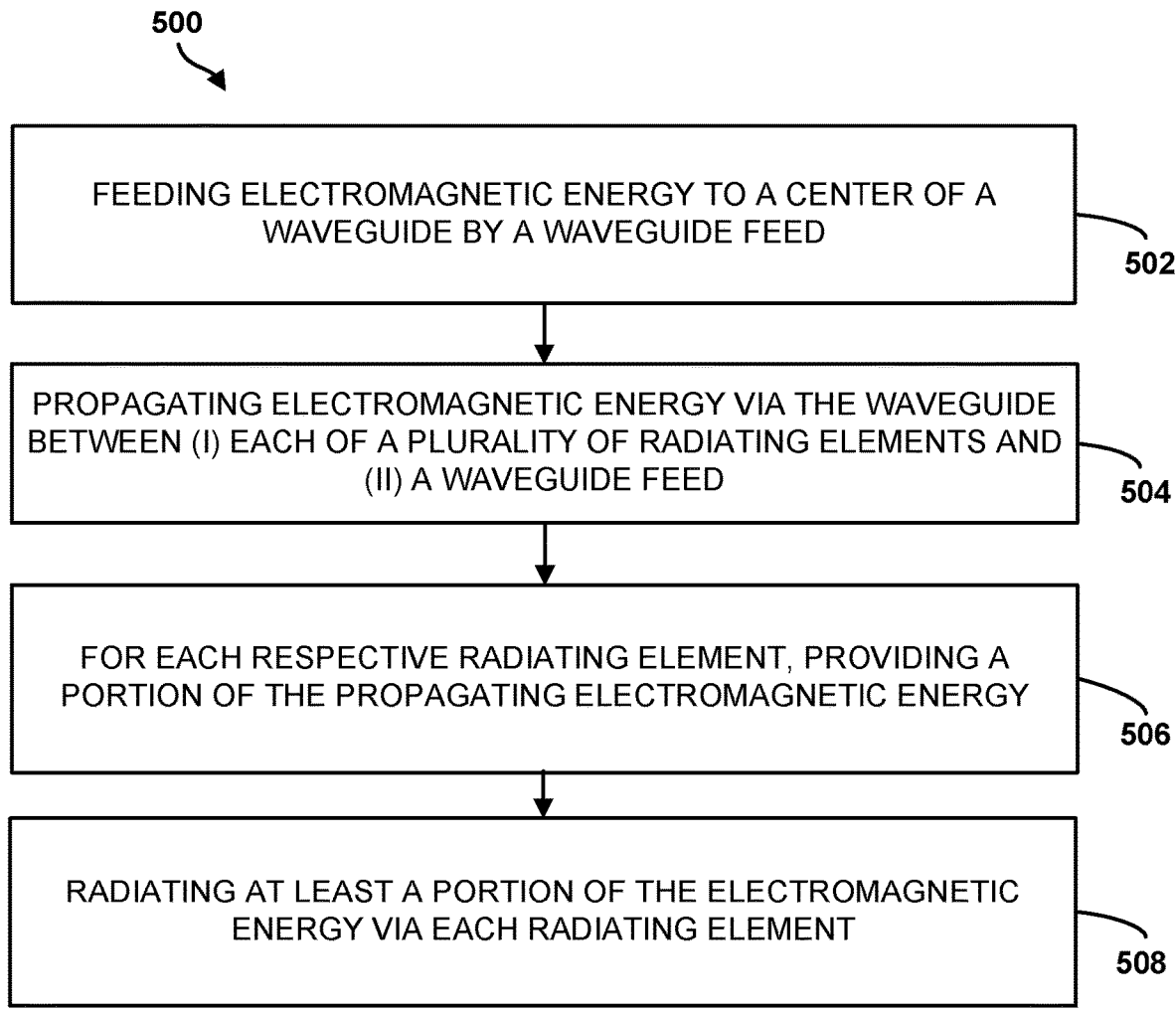
FIG. 5 is a flowchart of a method, in accordance with example embodiments.

FIG. 5 is a flowchart of an example method 500 to radiate electromagnetic energy. It should be understood that other methods of operation not described herein are possible as well.

It should also be understood that a given application of such an antenna may determine appropriate dimensions and sizes for various machined portions of the two metal layers described above (e.g., channel size, metal layer thickness, etc.) and/or for other machined (or non-machined) portions/components of the antenna described herein. For instance, as discussed above, some example radar systems may be configured to operate with W-band electromagnetic wave frequency of 77 GHz, which corresponds to millimeter electromagnetic wave length. At this frequency, the channels, ports, etc. of an apparatus fabricated by way of method 400 may be of given dimensions appropriated for the 77 GHz frequency. Other example antennas and antenna applications are possible as well.

Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 502, the method 500 includes feeding electromagnetic energy to a center of a waveguide by a waveguide feed. The waveguide feed may be coupled to the second side of the waveguide at a center location between a first half of a set of radiating elements and a second half of the set of radiating elements. For instance, the waveguide feed may be coupled to the second side of the waveguide along the length dimension of the waveguide. The waveguide feed represents a waveguide capable of transferring (i.e., feeding) electromagnetic energy to the center (or another portion) of another waveguide or multiple waveguides.

In some examples, the first half of the radiating elements may include a first set of radiating doublets and a first radiating singlet. The second half of the radiating elements may include a second set of radiating doublets and a second radiating singlet. For instance, the first set of radiating doublets and the second set of radiating doublets may each include two radiating doublets.

In some antenna configurations, the first and second radiating singlets are positioned together in the center of the linear array of radiating elements, such as in the configuration shown in FIG. 1A. In such a configuration, the sets of radiating doublets are positioned outside of the radiating singlets within the linear array. In other antenna configurations, the first and second radiating singlets are positioned on the ends of the linear array of radiating elements, such as in the configuration shown in FIG. 1B and FIG. 1C. In such a configuration, the sets of radiating doublets are positioned inside the radiating singlets within the linear array.

At block 504, the method 500 includes propagating electromagnetic energy (e.g., 77 GHz millimeter electromagnetic waves) via the waveguide between (i) each of a plurality of radiating elements and (ii) a waveguide feed. The radiating elements are configured to radiate electromagnetic energy and arranged symmetrically in a linear array.

In some examples, the geometry of the waveguide may include a height dimension and a length dimension such that the first and second sides of the waveguide are orthogonal to the height dimension and parallel to the length dimension. As such, the radiating elements may be coupled to the first side of the waveguide. For example, a waveguide may have a straight shape and the radiating elements may be aligned along the length of the waveguide.

At block 506, the method 500 includes, for each respective radiating element, providing a portion of the propagating electromagnetic energy. For example, the electromagnetic energy from the waveguide feed may be divided based on a taper profile. Particularly, each radiating element of the plurality of radiating elements may receive a portion of the electromagnetic energy based on the taper profile.

In some examples, the electromagnetic energy is divided evenly. In other examples, dividing the electromagnetic energy from the waveguide feed based on a taper profile unevenly divides the power from the waveguide feed. In further examples, dividing the electromagnetic energy from the waveguide feed further involves a beamforming network dividing the electromagnetic energy to a plurality of waveguides.

At block 508, the method 500 includes radiating at least a portion of the coupled electromagnetic energy via each radiating element. Each radiating element radiates a portion of the coupled electromagnetic energy based on an associated amplitude and phase for each respective radiating element defined by the taper profile.

It should be understood that other shapes and dimensions of the waveguide channels, portions of the waveguide channels, sides of the waveguide channels, wave-directing members, and the like are possible as well. In some embodiments, a rectangular shape of waveguide channels may be highly convenient to manufacture, though other methods known or not yet known may be implemented to manufacture waveguide channels with equal or even greater convenience.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

What is claimed is:

1. A system comprising:
    a plurality of radiating elements configured to radiate electromagnetic energy and arranged in a linear array;
    a waveguide feed; and
    a waveguide configured to guide electromagnetic energy between (i) each of the plurality of radiating elements and (ii) the waveguide feed, wherein the waveguide comprises a first side and a second side opposite the first side, and wherein the plurality of radiating elements is coupled to the first side of the waveguide;
    wherein the waveguide feed is coupled to the second side of the waveguide at a center location between a first half of the plurality of radiating elements and a second half of the plurality of radiating elements, and wherein the waveguide feed is configured to transfer electromagnetic energy between the waveguide and a component external to the waveguide.

2. The system of claim 1, wherein the waveguide feed is aligned orthogonally to a length of the waveguide.

3. The system of claim 1, wherein the first half of the plurality of radiating elements comprises a first set of radiating doublets and a first radiating singlet, and
    wherein the second half of the plurality of radiating elements comprises a second set of radiating doublets and a second radiating singlet.

4. The system of claim 3, wherein the first set of radiating doublets comprises two radiating doublets and the second set of radiating doublets comprises two radiating doublets.

5. The system of claim 3, wherein the first radiating singlet is positioned outside of the first set of radiating doublets at a first end of the linear array and the second radiating singlet is positioned outside of the second set of radiating doublets at a second end of the linear array.

6. The system of claim 3, wherein the first radiating singlet and the second radiating singlet are positioned proximate a center of the linear array such that the first set of radiating doublets is positioned outside the first radiating singlet and the second set of radiating doublets is positioned outside the second radiating singlet.

7. The system of claim 1, further comprising:
    a power dividing network defined by the waveguide and configured to divide the electromagnetic energy transferred by the waveguide feed based on a taper profile, wherein each radiating element receives a portion of the electromagnetic energy based on the taper profile.

8. The system of claim 1, wherein the waveguide feed is coupled to a beamforming network, wherein the beamforming network is coupled to a plurality of respective waveguides and each waveguide has a respective plurality of radiating elements.

9. The system of claim 1, wherein the first side of the waveguide is a top side of the waveguide and the second side of the waveguide is a bottom side of the waveguide.

10. The system of claim 1, wherein the waveguide feed is coupled to the waveguide at a junction, and wherein the junction is configured to divide power based on geometry of at least one of the waveguide feed and the waveguide.

11. A method of radiating radar comprising:
   feeding electromagnetic energy to a center of a waveguide by a waveguide feed, wherein the waveguide comprises a first side and a second side opposite of the first side;
   propagating electromagnetic energy via the waveguide between (i) each of a plurality of radiating elements and (ii) the waveguide feed, wherein the plurality of radiating elements is arranged in a linear array coupled to the first side of the waveguide;
   for each radiating element, providing a portion of the propagating electromagnetic energy; and
   radiating at least a portion of the propagating electromagnetic energy via each radiating element.

12. The method of claim 11, wherein the waveguide feed is coupled to the second side of the waveguide at a center location between a first half of the plurality of radiating elements and a second half of the plurality of radiating elements.

13. The method of claim 12, wherein the first half of the plurality of radiating elements comprises a first set of radiating doublets and a first radiating singlet, and wherein the second half of the plurality of radiating elements comprises a second set of radiating doublets and a second radiating singlet.

14. The method of claim 13, wherein the first set of radiating doublets comprises two radiating doublets and the second set of radiating doublets comprises two radiating doublets.

15. The method of claim 13, wherein the first radiating singlet is positioned outside of the first set of radiating doublets at a first end of the linear array and the second radiating singlet is positioned outside of the second set of radiating doublets at a second end of the linear array.

16. The method of claim 13, wherein the first radiating singlet and the second radiating singlet are positioned proximate a center of the linear array such that the first set of radiating doublets is positioned outside the first radiating singlet and the second set of radiating doublets is positioned outside the second radiating singlet.

17. The method of claim 11, further comprising:
   dividing the electromagnetic energy from the waveguide feed based on a taper profile, wherein each radiating element receives a portion of the electromagnetic energy based on the taper profile.

18. The method of claim 17, wherein dividing the electromagnetic energy from the waveguide feed further comprises a beamforming network dividing the electromagnetic energy to a plurality of waveguides.

19. The method of claim 11, wherein the first side of the waveguide is located in a first portion of a split block and the second side of the waveguide is located in a second portion of the split block.

20. A radar system comprising:
   a plurality of radiating elements configured to radiate electromagnetic energy and arranged in a linear array, wherein the plurality of radiating elements comprises a set of radiating doublets and a set of radiating singlets;
   a waveguide feed; and
   a waveguide configured to guide electromagnetic energy between (i) each of the plurality of radiating elements and (ii) the waveguide feed, wherein the waveguide comprises a first side and a second side opposite the first side, and wherein the plurality of radiating elements is coupled to the first side of the waveguide;
   wherein the waveguide feed coupled to the second side of the waveguide at a center location between a first half of the plurality of radiating elements and a second half of the plurality of radiating elements, and wherein the waveguide feed is configured to transfer electromagnetic energy between the waveguide and a component external to the waveguide.

* * * * *